US006963546B2

(12) United States Patent
Misra et al.

(10) Patent No.: US 6,963,546 B2
(45) Date of Patent: Nov. 8, 2005

(54) MULTI-USER DETECTION USING AN ADAPTIVE COMBINATION OF JOINT DETECTION AND SUCCESSIVE INTERFACE CANCELLATION

(75) Inventors: Raj Mani Misra, Brooklyn, NY (US); Ariela Zeira, Huntington, NY (US); Jung-Lin Pan, Selden, NY (US)

(73) Assignee: InterDigital Technology Corp., Wilmington, DE (US)

( * ) Notice: Subject to any disclaimer, the term of this patent is extended or adjusted under 35 U.S.C. 154(b) by 854 days.

(21) Appl. No.: 09/783,792

(22) Filed: Feb. 15, 2001

(65) Prior Publication Data

US 2002/0018454 A1 Feb. 14, 2002

Related U.S. Application Data

(60) Provisional application No. 60/189,680, filed on Mar. 15, 2000, and provisional application No. 60/207,700, filed on May 26, 2000.

(51) Int. Cl.[7] .................................................. H04L 5/14

(52) U.S. Cl. ....................... 370/294; 370/325; 370/337; 370/320; 370/321; 370/328; 370/342; 375/343; 375/346; 375/348; 375/349

(58) Field of Search ................................ 370/294, 335, 370/337, 320, 321, 328, 342, 346, 347; 375/343, 346, 348, 349, 296, 231, 232; 455/522

(56) References Cited

U.S. PATENT DOCUMENTS 5,646,964 A * 7/1997 Ushirokawa et al. ....... 375/346
5,673,288 A * 9/1997 Okanoue .................... 375/231
5,790,549 A * 8/1998 Dent .......................... 370/479
5,835,541 A * 11/1998 Namekata et al. .......... 375/355
5,854,784 A * 12/1998 Solve et al. ................ 370/311
5,933,423 A * 8/1999 Laakso et al. .............. 370/335
6,009,334 A * 12/1999 Grubeck et al. ......... 455/456.2
6,032,052 A * 2/2000 Richardson ................. 455/522
6,088,324 A * 7/2000 Sato ........................... 370/203
6,240,099 B1 * 5/2001 Lim et al. ................... 370/441
6,301,293 B1 * 10/2001 Huang et al. ............... 375/130
6,466,566 B1 * 10/2002 De Gaudenzi et al. ..... 370/342
6,570,863 B1 * 5/2003 Kim et al. .................. 370/342
6,665,334 B1 * 12/2003 Wichman et al. ........... 375/148
2001/0026578 A1 * 10/2001 Ando

FOREIGN PATENT DOCUMENTS

DE 19616828 A1 11/1997

OTHER PUBLICATIONS

Anja Klein and Paul W. Baier, "Linear Unbiased Data Estimation in Mobile Radio Systems Applying CDMA", IEEE Journal on Selected Areas in Communications, vol. 11, No. 7, Sep. 1993, pp. 1058–1065.

(Continued)

*Primary Examiner*—Wellington Chin
*Assistant Examiner*—Kevin Mew
(74) *Attorney, Agent, or Firm*—Volpe and Koenig, P.C.

(57) ABSTRACT

A time division duplex communication system using code division multiple access transmits a plurality of data signals over a shared spectrum in a time slot. A combined signal is received over the shared spectrum in the time slot. The plurality of data signals are grouped into a plurality of groups. The combined signal is matched filtered based on in part symbol responses associated with the data signals of one of the groups. Data from each data signal in the one group is jointly detected. An interference signal is constructed based on in part the one group detected data. The constructed interference signal is subtracted from the combined signal. Data from the other groups is detected by processing the subtracted signal.

4 Claims, 8 Drawing Sheets

OTHER PUBLICATIONS

Lars K. Rasmussen, Teng J. Lim and Ana–Louise Johansson, "A Matrix–Algebraic Approach to Successive Interference Cancellation in CDMA", IEEE Transactions on Communications, vol. 48, No. 1, Jan. 2000, pp. 145–151.

Anja Klein, Ghassan Kawas Kaleh and Paul W. Baier, "Zero Forcing and Minimum Mean–Square–Error–Equalization for Multiuser Detection in Code–Division Multiple–Access Channels", IEEE Transactions on Vehicular Technology, vol. 45, No. 2, May 1996, pp. 276–287.

H. R. Karimi and N. W. Anderson, "A Novel and Efficient Solution to Block–Based Joint–Detection Using Approximate Cholesky Factorization", Ninth IEEE International Symposium, vol. 3, Sep. 8–11, 1998, pp. 1340–1345.

Pulin Patel and Jack Holtzman, "Analysis of a Simple Successive Interference Cancellation Scheme in a DS/CDMA System", IEEE Journal on Selected Areas in Communications, vol. 12, No. 5, Jun. 1994, pp. 796–807.

Andrew L. C. Hui and Khaled Ben Letaief, "Successive Interference Cancellation for Multiuser Asynchronous DS/CDMA Detectors in Multipath Fading Links", IEEE Transactions on Communications, vol. 46, No. 3, Mar. 1998, pp. 384–391.

Youngkwon Cho and Jae Hong Lee, "Analysis of an Adaptive SIC for Near–Far Resistant DS–CDMA", IEEE Transactions on Communications, vol. 46, No. 11, Nov. 1998, pp. 1429–1432.

Tik–Bin Oon, Raymond Steele and Ying Li, "Performance of an Adaptive Successive Serial–Parallel CDMA Cancellation Scheme in Flat Rayleigh Fading Channels", IEEE Transactions on Vehicular Technology, vol. 49, No. 1, Jan. 2000, pp. 130–147.

"Channel Impulse Response Model", UMTS 30.03 version 3.2.0, TR 101 112 version 3.2.0 (1998). pp. 42–43 and 65–66.

3rd Generation Partnership Project; Technical Specification Group Radio Access Networks; UTRA (UE) TDD; Radio Transmission and Reception 3G TS 25.102 version 3.3.0 Release 1999, p. 37.

3rd Generation Partnership Project; Technical Specification Group Radio Access Network; Physical Channels and Mapping of Transport Channels onto Physical Channels (TDD), 3G TS 25.221 version 3.20.0 (Mar. 2000), pp. 3–10.

H. R. Karimi et al., "A Novel and Efficient Solution to Block–Based Joint–Detection Using Approximate Cholesky Factorization", IEEE International Symposium on Personal, Indoor and Mobile Radio Communications, vol. 3, 1998, pp. 1340–1345.

J. Malard et al., "Efficiency and Scalability of Two Parallel QR Factorization Algorithms", Proceedings of the IEEE Scalable High–Performance Computing Conference (Cat. No. 94TH0637–9), Proceedings of IEEE Scalable High Performance Computing Conference, Knoxville, TN, USA, May 23–25, 1994, pp. 615–622.

* cited by examiner

PRIOR ART

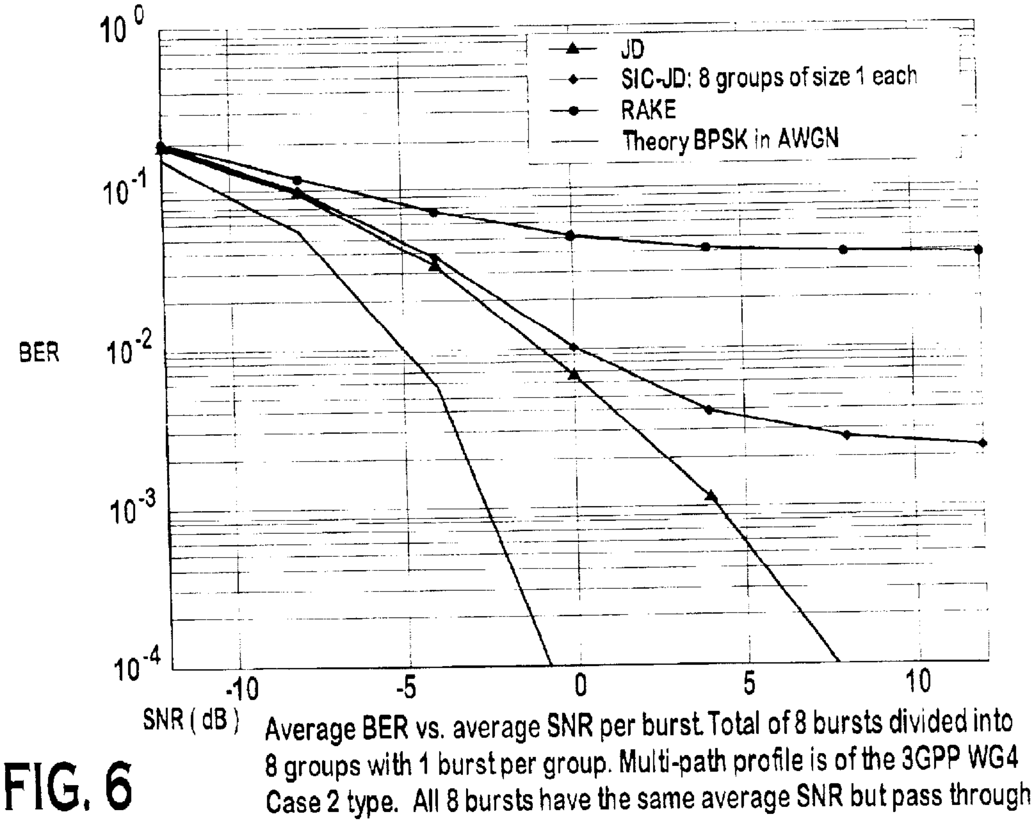

FIG. 6

Average BER vs. average SNR per burst. Total of 8 bursts divided into 8 groups with 1 burst per group. Multi-path profile is of the 3GPP WG4 Case 2 type. All 8 bursts have the same average SNR but pass through uncorrelated channel.

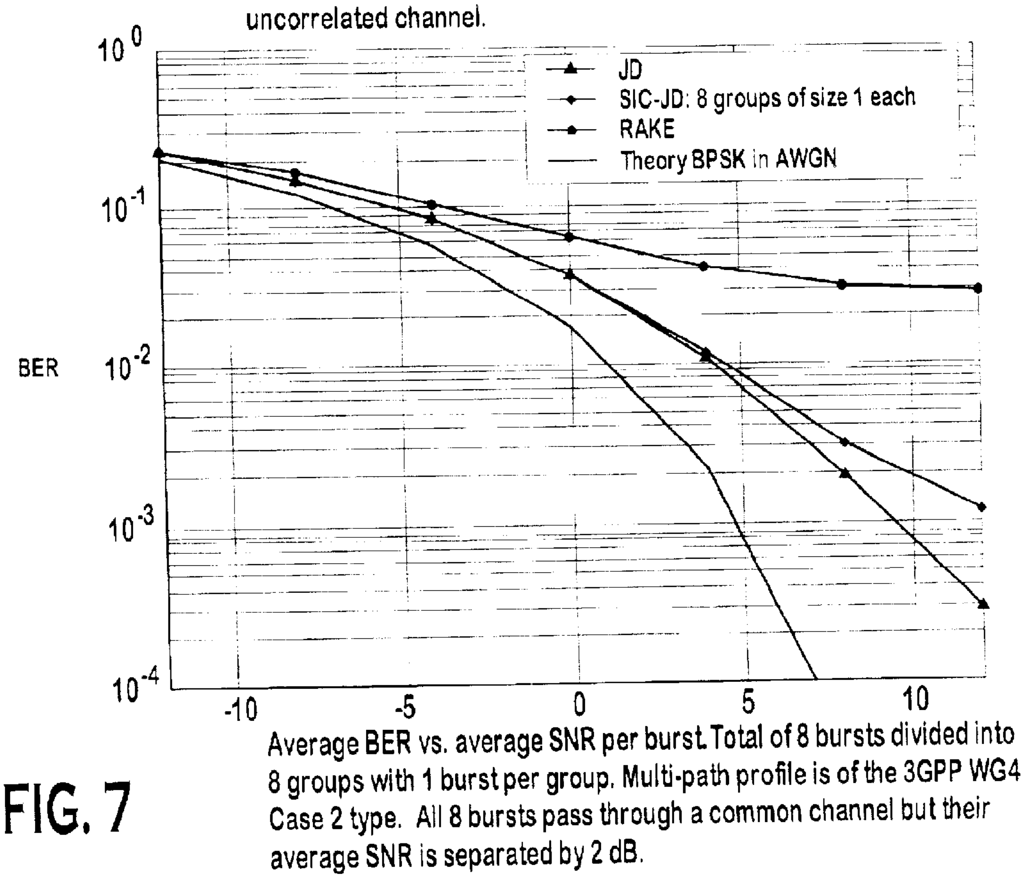

FIG. 7

Average BER vs. average SNR per burst. Total of 8 bursts divided into 8 groups with 1 burst per group. Multi-path profile is of the 3GPP WG4 Case 2 type. All 8 bursts pass through a common channel but their average SNR is separated by 2 dB.

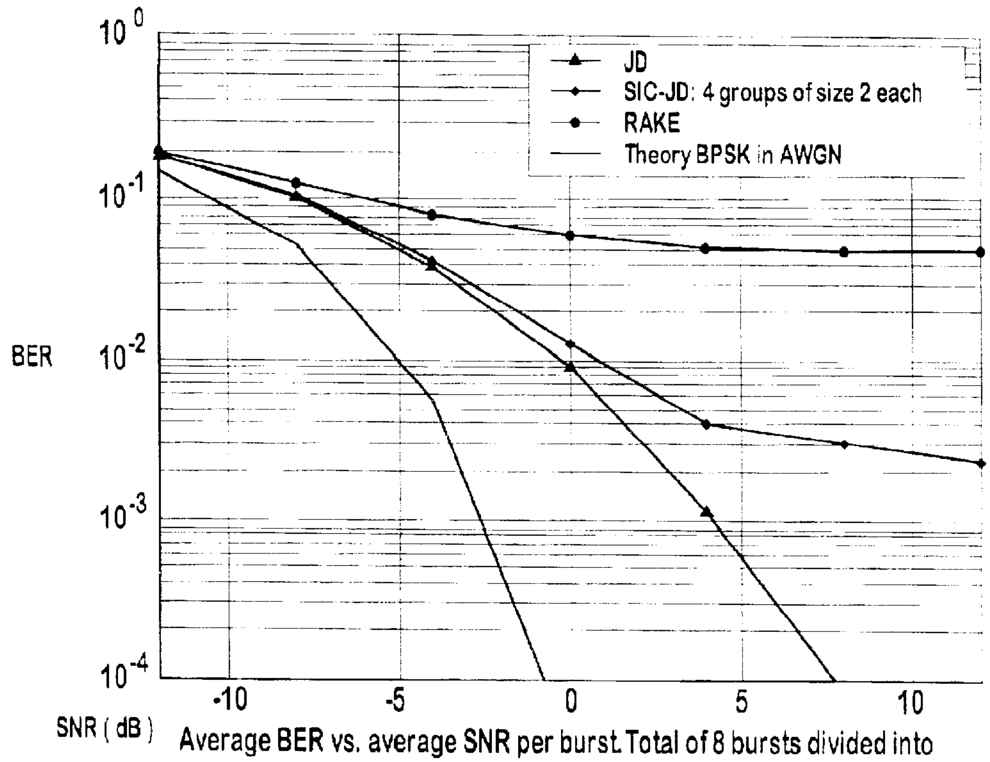

FIG. 8

Average BER vs. average SNR per burst. Total of 8 bursts divided into 4 groups with 2 bursts per group. All bursts in the same group are subjected to the same channel. All 4 groups have the same average SNR but pass through uncorrelated channels with multi-path profile of type ITU Vehicular A.

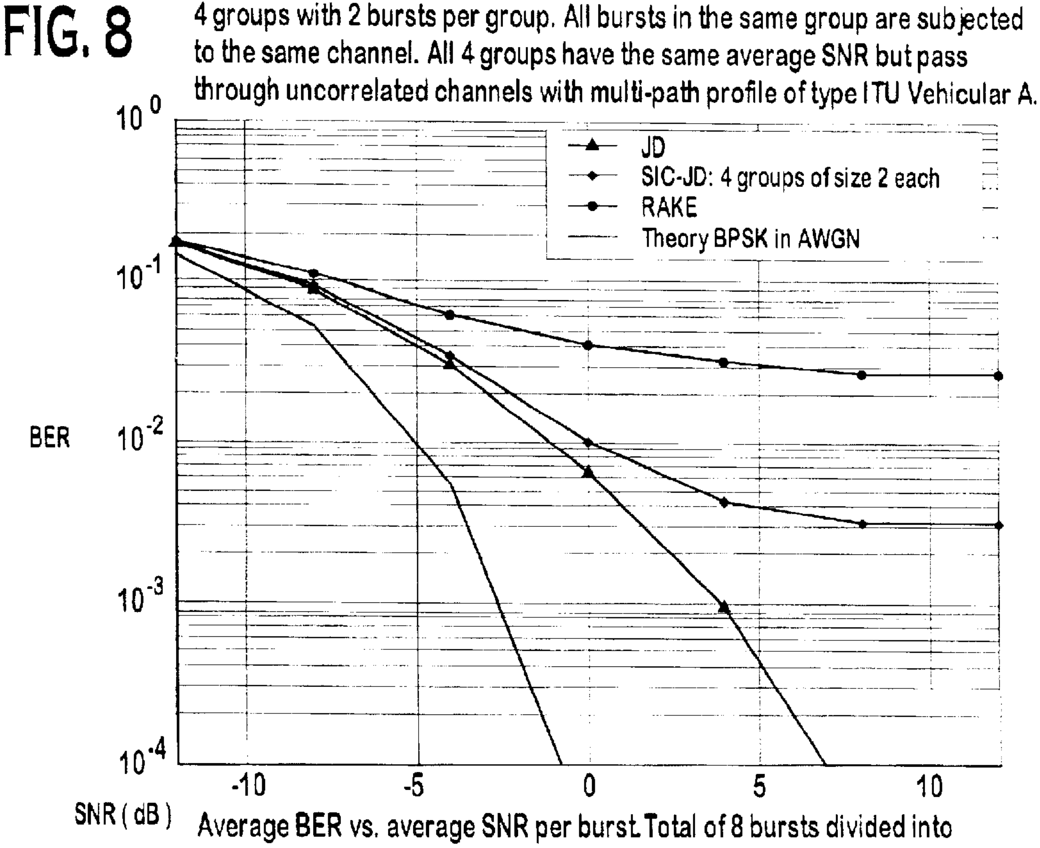

FIG. 9

Average BER vs. average SNR per burst. Total of 8 bursts divided into 4 groups with 2 bursts per group. All bursts in the same group are subjected to the same channel. All 4 groups have the same average SNR but pass through uncorrelated channels with multi-path profile of type 3GPP WG4 Case 2.

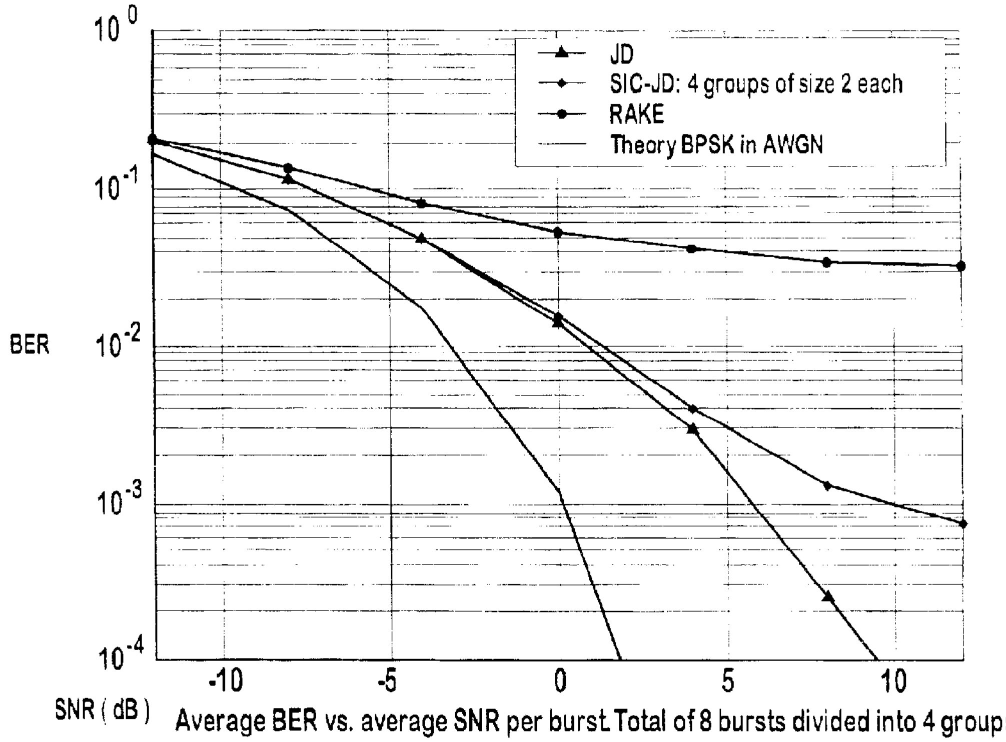

FIG. 10

Average BER vs. average SNR per burst. Total of 8 bursts divided into 4 groups with 2 bursts per group. All bursts in the same group are subjected to the same channel. All 4 groups pass through a common channel but their average SNR is seperated by 2 dB. Multi-path profile is of type ITU Vehicular A.

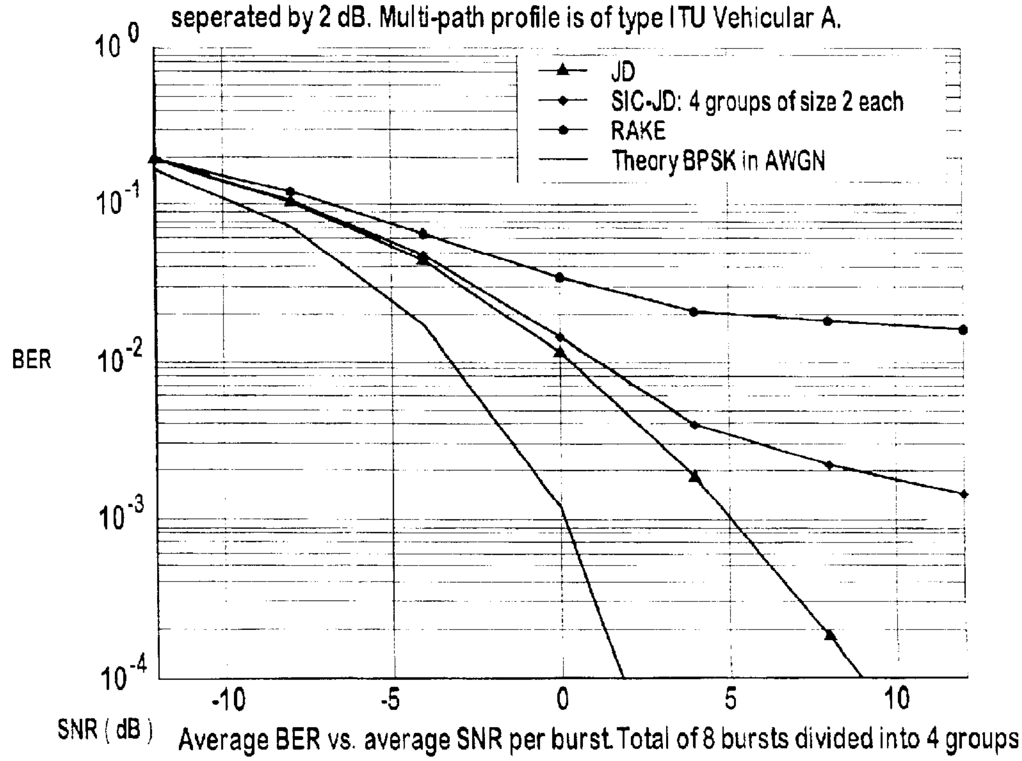

FIG. 11

Average BER vs. average SNR per burst. Total of 8 bursts divided into 4 groups with 2 bursts per group. All bursts in the same group are subjected to the same channel. All 4 groups pass through a common channel but their average SNR is seperated by 2 dB. Multi-path profile is of type 3GPP WG4 Case 2.

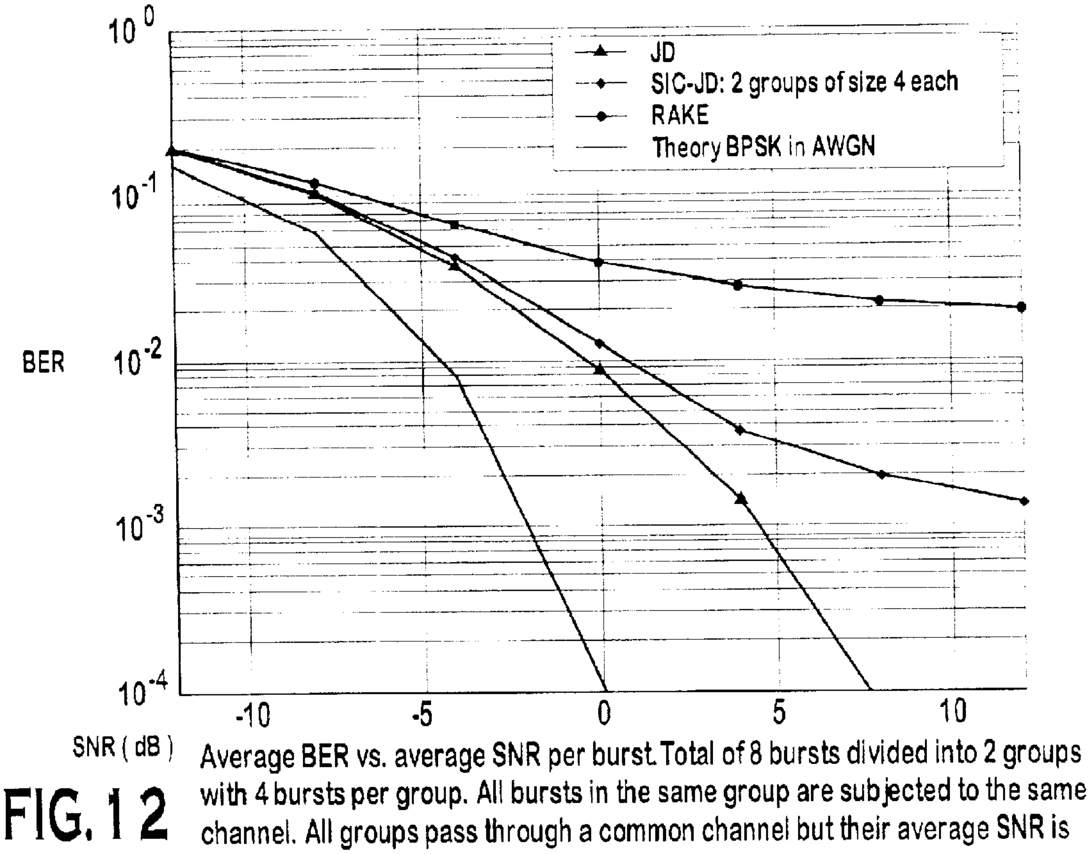
FIG. 12 Average BER vs. average SNR per burst. Total of 8 bursts divided into 2 groups with 4 bursts per group. All bursts in the same group are subjected to the same channel. All groups pass through a common channel but their average SNR is seperated by 2 dB. Multi-path profile is of type ITU Vehicular A.

MULTI-USER DETECTION USING AN ADAPTIVE COMBINATION OF JOINT DETECTION AND SUCCESSIVE INTERFACE CANCELLATION

This application claims priority to U.S. Provisional Patent Application No. 60/189,680, filed on Mar. 15, 2000 and U.S. Provisional Patent Application No. 60/207,700, filed on May 26, 2000.

BACKGROUND

The invention generally relates to wireless communication systems. In particular, the invention relates to joint detection of multiple user signals in a wireless communication system.

FIG. 1 is an illustration of a wireless communication system 10. The communication system 10 has base stations $\mathbf{12}_1$ to $\mathbf{12}_5$ which communicate with user equipments (UEs) $\mathbf{14}_1$ to $\mathbf{14}_3$. Each base station $\mathbf{12}_1$ has an associated operational area where it communicates with UEs $\mathbf{14}_1$ to $\mathbf{14}_3$ in its operational area.

In some communication systems, such as code division multiple access (CDMA) and time division duplex using code division multiple access (TDD/CDMA), multiple communications are sent over the same frequency spectrum. These communications are typically differentiated by their chip code sequences. To more efficiently use the frequency spectrum, TDD/CDMA communication systems use repeating frames divided into time slots for communication. A communication sent in such a system will have one or multiple associated chip codes and time slots assigned to it based on the communication's bandwidth.

Since multiple communications may be sent in the same frequency spectrum and at the same time, a receiver in such a system must distinguish between the multiple communications. One approach to detecting such signals is matched filtering. In matched filtering, a communication sent with a single code is detected. Other communications are treated as interference. To detect multiple codes, a respective number of matched filters are used. Another approach is successive interference cancellation (SIC). In SIC, one communication is detected and the contribution of that communication is subtracted from the received signal for use in detecting the next communication.

In some situations, it is desirable to be able to detect multiple communications simultaneously in order to improve performance. Detecting multiple communications simultaneously is referred to as joint detection. Some joint detectors use Cholesky decomposition to perform a minimum mean square error (MMSE) detection and zero-forcing block equalizers (ZF-BLEs). These detectors have a high complexity requiring extensive receiver resources.

Accordingly, it is desirable to have alternate approaches to multi-user detection.

SUMMARY

A time division duplex communication system using code division multiple access transmits a plurality of data signals over a shared spectrum in a time slot. A combined signal is received over the shared spectrum in the time slot. The plurality of data signals are grouped into a plurality of groups. The combined signal is matched filtered based on in part symbol responses associated with the data signals of one of the groups. Data from each data signal in the one group is jointly detected. An interference signal is constructed based on in part the one group detected data. The constructed interference signal is subtracted from the combined signal. Data from the other groups is detected by processing the subtracted signal.

BRIEF DESCRIPTION OF THE DRAWING(S)

FIGS. 6–12 are graphs comparing the performance of adaptive combination of joint detection and successive interference cancellation, full joint detection and a RAKE receiver.

DETAILED DESCRIPTION OF THE PREFERRED EMBODIMENT(S)

Figure 2:
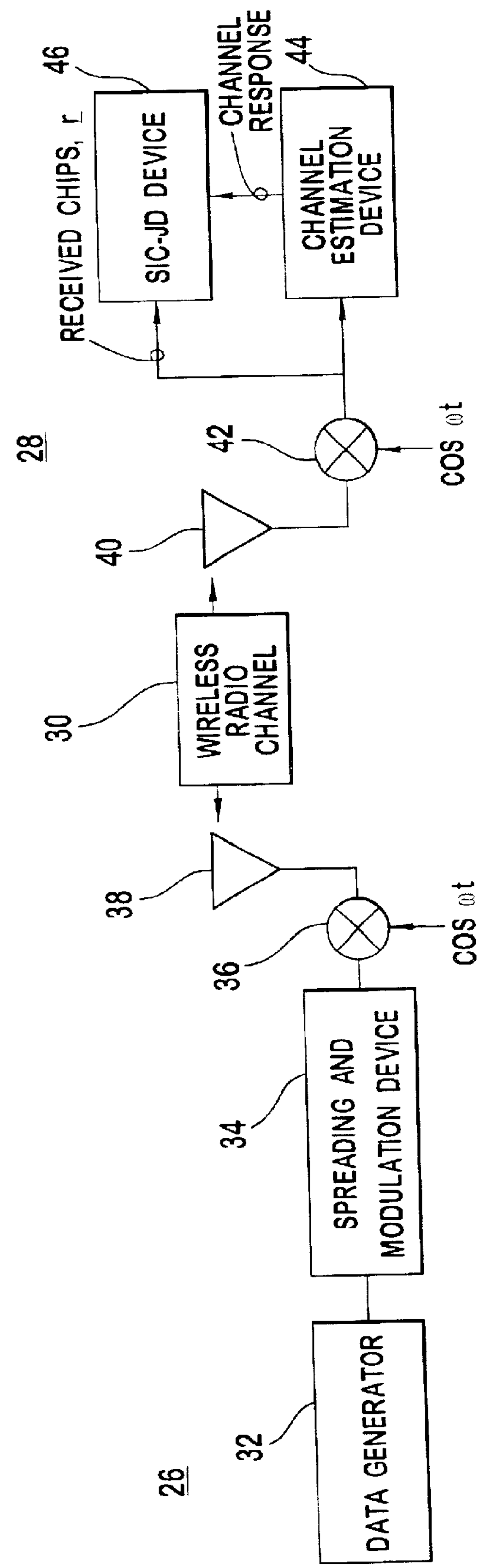
FIG. 2 is a simplified transmitter and a receiver using joint detection.

FIG. 2 illustrates a simplified transmitter 26 and receiver 28 using an adaptive combination of joint detection (JD) and successive interference cancellation (SIC), "SIC-JD", in a TDD/CDMA communication system. In a typical system, a transmitter 26 is in each UE $\mathbf{14}_1$ to $\mathbf{14}_3$ and multiple transmitting circuits 26 sending multiple communications are in each base station $\mathbf{12}_1$ to $\mathbf{12}_5$. A base station $\mathbf{12}_1$ will typically require at least one transmitting circuit 26 for each actively communicating UE $\mathbf{14}_1$ to $\mathbf{14}_3$. The SIC-JD receiver 28 may be at a base station $\mathbf{12}_1$, UEs $\mathbf{14}_1$ to $\mathbf{14}_3$ or both. The SIC-JD receiver 28 receives communications from multiple transmitters 26 or transmitting circuits 26.

Each transmitter 26 sends data over a wireless radio channel 30. A data generator 32 in the transmitter 26 generates data to be communicated over a reference channel to a receiver 28. Reference data is assigned to one or multiple codes and/or time slots based on the communications bandwidth requirements. A modulation and spreading device 34 spreads the reference data and makes the spread reference data time-multiplexed with a training sequence in the appropriate assigned time slots and codes. The resulting sequence is referred to as a communication burst. The communication burst is modulated by a modulator 36 to radio frequency. An antenna 38 radiates the RF signal through the wireless radio channel 30 to an antenna 40 of the receiver 28. The type of modulation used for the transmitted communication can be any of those known to those skilled in the art, such as direct phase shift keying (DPSK) or quadrature phase shift keying (QPSK).

Figure 1:
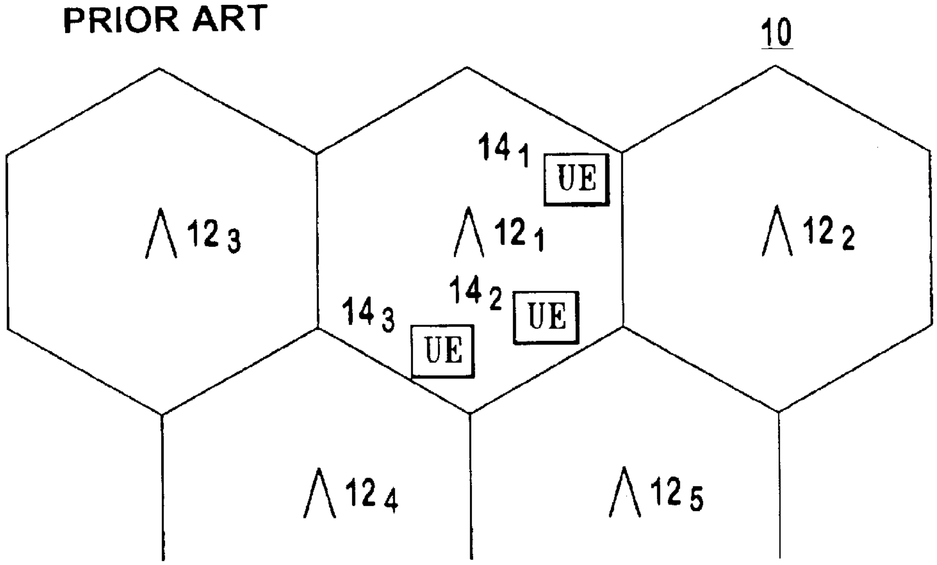
FIG. 1 is a wireless communication system.
Figure 3:
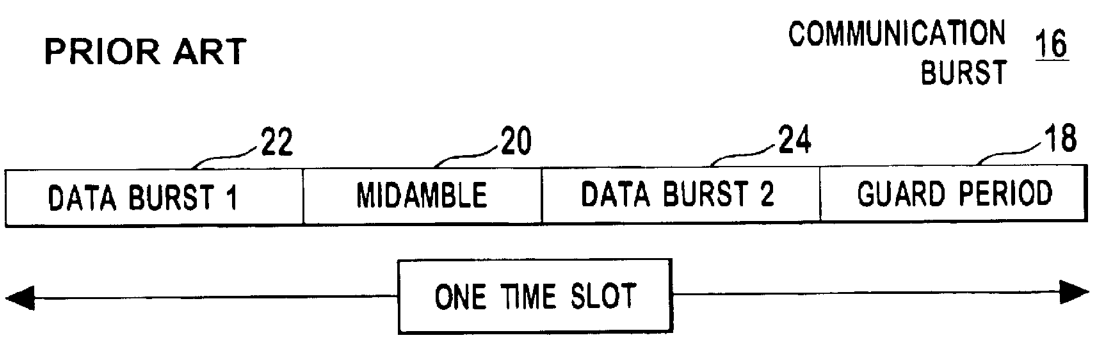
FIG. 3 is an illustration of a communication burst.

A typical communication burst 16 has a midamble 20, a guard period 18 and two data bursts 22, 24, as shown in FIG. 3. The midamble 20 separates the two data bursts 22, 24 and the guard period 18 separates the communication bursts to allow for the difference in arrival times of bursts transmitted from different transmitters. The two data bursts 22, 24 contain the communication burst's data and are typically the same symbol length. The midamble contains a training sequence.

The antenna 40 of the receiver 28 receives various radio frequency signals. The received signals are demodulated by a demodulator 42 to produce a baseband signal. The baseband signal is processed, such as by a channel estimation device 44 and a SIC-JD device 46, in the time slots and with the appropriate codes assigned to the communication bursts of the corresponding transmitters 26. The channel estimation device 44 uses the training sequence component in the baseband signal to provide channel information, such as channel impulse responses. The channel information is used by the SIC-JD device 46 to estimate the transmitted data of the received communication bursts as hard symbols.

The SIC-JD device 46 uses the channel information provided by the channel estimation device 44 and the known spreading codes used by the transmitters 26 to estimate the data of the various received communication bursts. Although SIC-JD is described in conjunction with a TDD/CDMA communication system, the same approach is applicable to other communication systems, such as CDMA.

Figure 4:
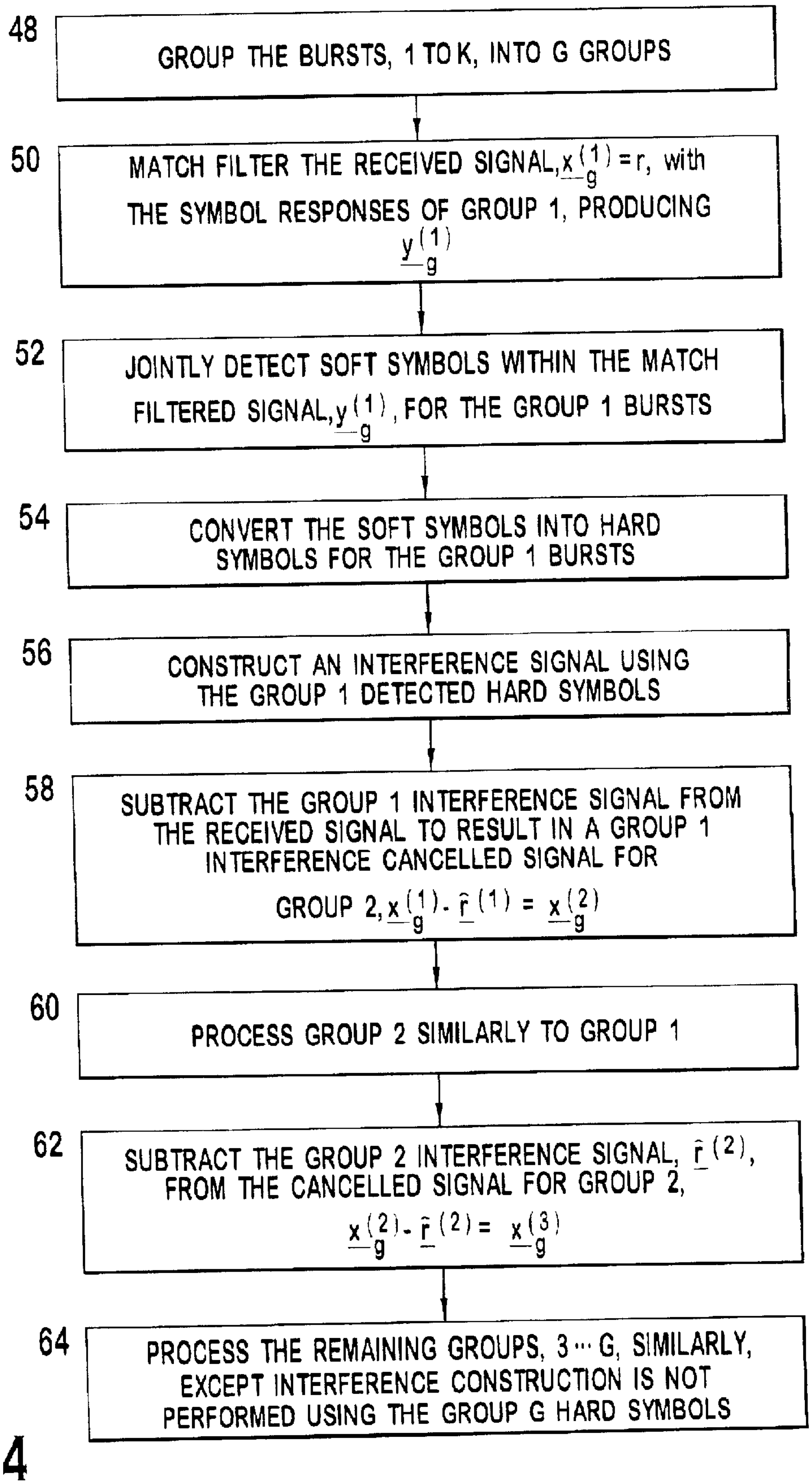
FIG. 4 is a flow chart of adaptive combination of joint detection and successive interference cancellation.

One approach to SIC-JD in a particular time slot in a TDD/CDMA communication system is illustrated in FIG. 4. A number of communication bursts are superimposed on each other in the particular time slot, such as K communication bursts. The K bursts may be from K different transmitters. If certain transmitters are using multiple codes in the particular time slot, the K bursts may be from less than K transmitters.

Each data burst 22, 24 of the communication burst 16 has a predefined number of transmitted symbols, such as $N_s$. Each symbol is transmitted using a predetermined number of chips of the spreading code, which is the spreading factor (SF). In a typical TDD communication system, each base station $\mathbf{12}_1$ to $\mathbf{12}_5$ has an associated scrambling code mixed with its communicated data. The scrambling code distinguishes the base stations from one another. Typically, the scrambling code does not affect the spreading factor. Although the terms spreading code and factor are used hereafter, for systems using scrambling codes, the spreading code for the following is the combined scrambling and spreading codes. As a result, each data burst 22, 24 has $N_s \times SF$ chips. After passing through a channel having an impulse response of W chips, each received burst has a length of $SF \times N_s + W - 1$, which is also represented as $N_c$ chips. The code for a $k^{th}$ burst of the K bursts is represented by $C^{(k)}$.

Each $k^{th}$ burst is received at the receiver and can be represented by Equation 1.

$$\underline{r}^{(k)} = A^{(k)} \underline{d}^{(k)}, k = 1 \cdots K \quad \text{Equation 1}$$

$\underline{r}^{(k)}$ is the received contribution of the $k^{th}$ burst. $A^{(k)}$ is the combined channel response, being an $N_c \times N_s$ matrix. Each $j^{th}$ column in $A^{(k)}$ is a zero-padded version of the symbol response $s^{(k)}$ of the $j^{th}$ element of $d^{(k)}$. The symbol response $s^{(k)}$ is the convolution of the estimated response $\underline{h}^{(k)}$ and spreading code $C^{(k)}$ for the burst.

$\underline{d}^{(k)}$ is the unknown data symbols transmitted in the burst. The estimated response for each $k^{th}$ burst, $\underline{h}^{(k)}$, has a length W chips and can be represent by Equation 2.

$$\underline{h}^{(k)} = \gamma^{(k)} \cdot \underline{\tilde{h}}^{(k)} \quad \text{Equation 2}$$

$\gamma^{(k)}$ reflects the transmitter gain and/or path loss.

$\underline{\tilde{h}}^{(k)}$ represents the burst-specific fading channel response or for a group of bursts experiencing a similarly channel, $\underline{\tilde{h}}^{(g)}$ represents the group-specific channel response. For uplink communications, each $\underline{h}^{(k)}$ as well as each $\gamma^{(k)}$ and $\underline{\tilde{h}}^{(k)}$ are distinct. For the downlink, all of the bursts have the same $\underline{\tilde{h}}^{(k)}$ but each $\gamma^{(k)}$ is different. If transmit diversity is used in the downlink, each $\gamma^{(k)}$ and $\underline{\tilde{h}}^{(k)}$ are distinct.

The overall received vector from all K bursts sent over the wireless channel is per Equation 3.

$$\underline{r} = \sum_{i=1}^{K} \underline{r}^{(k)} + \underline{n} \quad \text{Equation 3}$$

$\underline{n}$ is a zero-mean noise vector.

By combining the $A^{(k)}$ for all data bursts into matrix A and all the unknown data for each burst $\underline{d}^{(k)}$ into matrix $\underline{d}$, Equation 1 becomes Equation 4.

$$\underline{r} = A\underline{d} + \underline{n} \quad \text{Equation 4}$$

SIC-JD determines the received power of each $k^{th}$ burst. This determination may be based on apriori knowledge at the receiver 28, burst-specific channel estimation from a burst-specific training sequence, or a bank of matched filters. The K bursts are arranged in descending order based on the determined received power.

Figure 5:
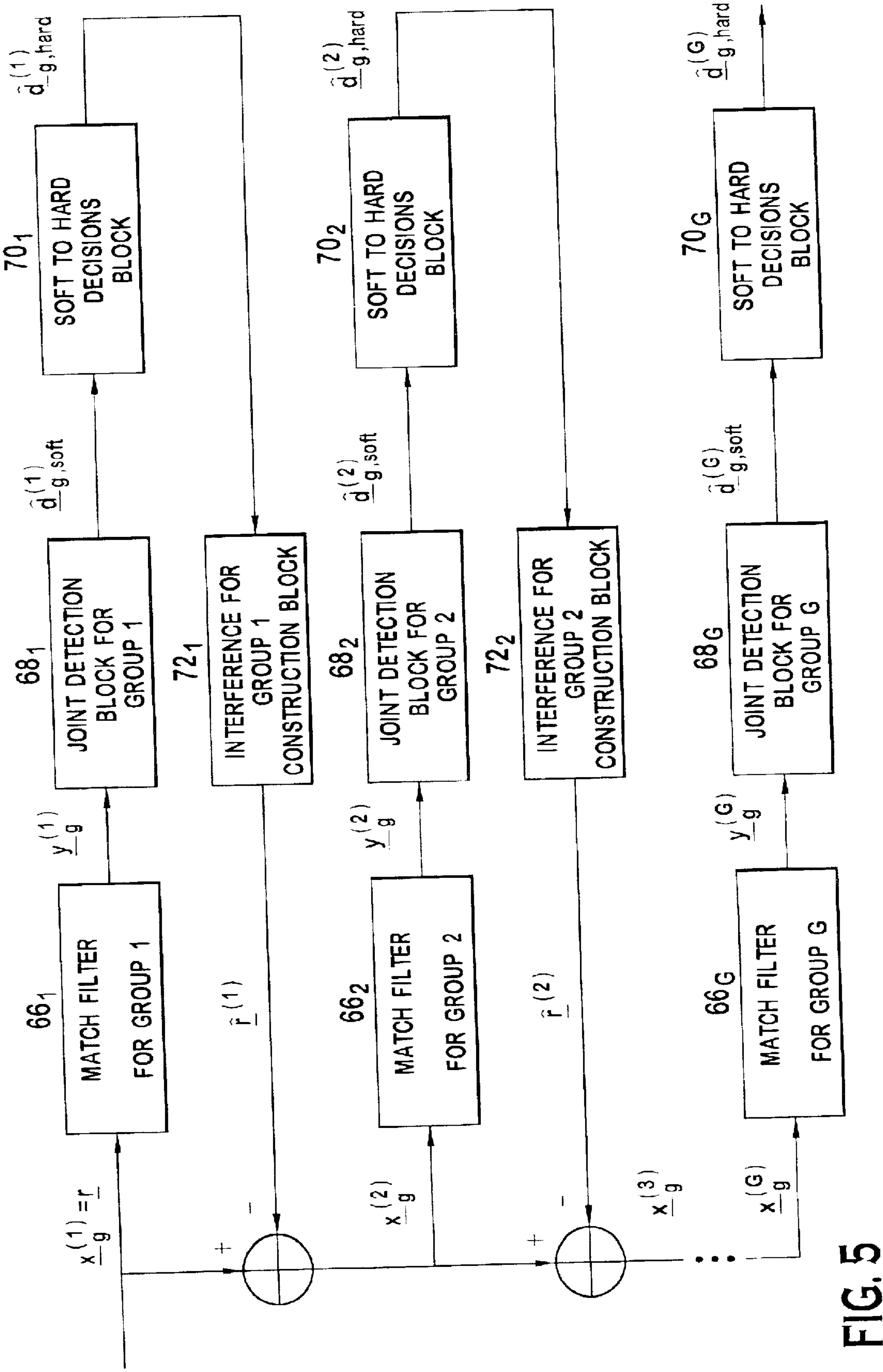
FIG. 5 is an illustration of an adaptive combination of joint detection and successive interference cancellation device.

Bursts having roughly the same power level, such as within a certain threshold, are grouped together and are arranged into G groups, 48. The G groups are arranged into descending order by their power, such as from group 1 to G with group 1 having the highest received power. FIG. 5 is an illustration of a SIC-JD device 46 performing SIC-JD based on the G groups.

For the group with the highest received power, group 1, the symbol response matrix for only the bursts in group 1, $A_g^{(1)}$, is determined. $A_g^{(1)}$ contains only the symbol responses of the bursts in group 1. The received vector, $\underline{r}$, is modeled for group 1 as $$\underline{x}_g^{(1)}.$$

As a result, Equation 4 becomes Equation 5 for group 1.

$$\underline{x}_g^{(1)} = A_g^{(1)}\underline{d}_g^{(1)} + \underline{n} \quad \text{Equation 5}$$

$$\underline{d}_g^{(1)}$$

is the data in the bursts of group 1. Equation 5 addresses both the effects of inter symbol interference (ISI) and multiple access interference (MAI). As a result, the effects of the other groups, groups 2 to G, are ignored.

The received vector, $$\underline{x}_g^{(1)},$$

is matched filtered to the symbol responses of the bursts in group 1 by a group 1 matched filter $\mathbf{66}_1$, such as per Equation 6, 50.

$$\underline{y}_g^{(1)} = A_g^{(1)H}\underline{x}_g^{(1)} \quad \text{Equation 6}$$

$$\underline{y}_g^{(1)}$$

is the matched filtered result.

A joint detection is performed on group 1 by a group 1 joint detection device $\mathbf{68}_1$ to make a soft decision estimate of $$\hat{\underline{d}}_{g,soft}^{(1)},$$

using the matched filtered result $$\underline{y}_g^{(1)},$$

52. One JD approach is to compute the least-squares, zero-forcing, solution of Equation 7.

$$\hat{\underline{d}}_{g,soft}^{(1)} = \left(A_g^{(1)H}A_g^{(1)}\right)^{-1}\underline{y}_g^{(1)} \quad \text{Equation 7}$$

$$A_g^{(1)H}$$

is the hermetian of $A_g^{(1)}$. Another JD approach is to compute the minimum mean square error solution (MMSE) as per Equation 8.

$$\hat{\underline{d}}_{g,soft}^{(1)} = \left(A_g^{(1)H}A_g^{(1)} + \sigma^2 I\right)^{-1}\underline{y}_g^{(1)} \quad \text{Equation 8}$$

I is the Identity matrix and $\sigma^2$ is the standard deviation.

One advantage to performing joint detection on only a group of bursts is that the complexity of analyzing a single group versus all the signals is reduced. Since $$A_g^{(1)H}$$

and $A_g^{(1)}$ are banded block Toeplitz matrices, the complexity in solving either Equation 7 or 8 is reduced. Additionally, Cholesky decomposition may be employed with a negligible loss in performance. Cholesky decomposition performed on a large number of bursts is extremely complex. However, on a smaller group of users, Cholesky decomposition can be performed at a more reasonable complexity.

The soft decisions, $$\hat{\underline{d}}_{g,soft}^{(1)},$$

are converted into hard decisions, $$\hat{\underline{d}}_{g,hard}^{(1)},$$

by soft to hard decision block $\mathbf{70}_1$ as the received data for group 1, 54. To process the other weaker groups, the multiple access interference caused by group 1 onto the weaker groups is estimated by a group 1 interference construction block $\mathbf{72}_1$ using Equation 9, 56.

$$\hat{\underline{r}}^{(1)} = A_g^{(1)}\hat{\underline{d}}_{g,hard}^{(1)} \quad \text{Equation 9}$$

$$\hat{\underline{r}}^{(1)}$$

is the estimated contribution of group 1 to $\underline{r}$.

For the next group 2, the estimated contribution of group 1 is removed from the received vector, $$\underline{x}_g^{(1)},$$

to produce $$\underline{x}_g^{(2)},$$

such as by a subtractor as per Equation 10, 58.

$$\underline{x}_g^{(2)} = \underline{x}_g^{(1)} - \hat{\underline{r}}^{(1)} \quad \text{Equation 10}$$

As a result, multiple access interference from group 1 is effectively canceled from the received signal. The next strongest group, group 2, is processed similarly using $$\underline{x}_g^{(2)},$$

with group 2 matched filter $\mathbf{66}_2$, group 2 JD block $\mathbf{68}_2$, soft to hard decision block $\mathbf{70}_2$ and group 2 interference construction block $\mathbf{72}_2$, 60. The constructed group 2 interference, $$\hat{\underline{r}}^{(2)},$$

is subtracted, such as by subtractor $\mathbf{24}_2$, from the interference cancelled signal for group 2, $$\underline{x}_g^{(2)} - \hat{\underline{r}}^{(2)} = \underline{x}_g^{(3)},$$

62. Using this procedure, each group is successively processed until the final group G. Since group G is the last group, the interference construction does not need to be performed. Accordingly, group G is only processed with group G matched filter $\mathbf{66}_G$, group G JD block $\mathbf{68}_G$ and soft to hard decisions block $\mathbf{70}_G$ to recovery the hard symbols, 64.

When SIC-JD is performed at a UE $\mathbf{14}_1$, it may not be necessary to process all of the groups. If all of the bursts that the UE $\mathbf{14}_1$ is intended to receive are in the highest received power group or in higher received power groups, the UE $\mathbf{14}_1$, will only have to process the groups having its bursts. As a result, the processing required at the UE $\mathbf{14}_1$, can be further reduced. Reduced processing at the UE $\mathbf{14}_1$ results in reduced power consumption and extended battery life.

SIC-JD is less complex than a single-step JD due to the dimension $N_c \times K \cdot N_s$ matrix being replaced with G JD stages of dimension $N_c \times n_i \cdot N_s$ where i=1 to G, $n_1$ is the number of bursts in the $i^{th}$ group. The complexity of JD is proportional to the square to cube of the number of bursts being jointly detected.

An advantage of this approach is that a trade-off between computational complexity and performance can be achieved. If all of the bursts are placed in a single group, the solution reduces to a JD problem. The single grouping can be achieved by either forcing all the bursts into one group or using a broad threshold. Alternately, if the groups contain only one signal or only one signal is received, the solution reduces to a SIC-LSE problem. Such a situation could result using a narrow threshold or forcing each burst into its own group, by hard limiting the group size. By selecting the thresholds, an optional tradeoff between performance and complexity can be achieved.

FIGS. 6 to 12 are simulation results that compare the bit error rate (BER) performance of SIC-JD to full JD and RAKE-like receivers under various multi-path fading channel conditions. The parameters chosen are those of the 3G UTRA TDD CDMA system: SF=61 and W=57. Each TDD burst/time-slot is 2560 chips or 667 microseconds long. The bursts carry two data fields with $N_s$ QPSK symbols each, a midamble field and a guard period. Each simulation is run over 1000 timeslots. In all cases the number of bursts, K is chosen to be 8. All receivers are assumed to have exact knowledge of the channel response of each burst, which is used to perfectly rank and group the bursts. The channel response is assumed to be time-invariant over a time-slot, but successive time-slots experience uncorrelated channel responses. No channel coding was applied in the simulation. The JD algorithm jointly detects all K bursts. The RAKE-like receiver was a bank of matched filters, $$\hat{\underline{d}}^{(i)} = A^{(i)^H} \underline{r}^{(i)},$$

for an $i^{th}$ burst's code. The maximal ratio combiner (MRC) stage is implicit in these filters because they are matched to the entire symbol-response.

The performance was simulated under fading channels with multi-path profiles defined by the ITU channel models, such as the Indoor A, Pedestrian A, Vehicular A models, and the 3GPP UTRA TDD Working Group 4 Case 1, Case 2 and Case 3 models. In Vehicular A and Case 2 channels, the SIC-JD suffered a degradation of up to 1 decibel (dB) as compared to the full JD in the 1% to 10% BER range. For all other channels, the SIC-JD performance was within 0.5 dB of that of the full JD. Since Vehicular A and Case 2 represent the worst-case amongst all cases studied, only the performance plots are shown. Amongst all channels simulated, Vehicular A and Case 2 have the largest delay spread. Vehicular A is a six tap model with relative delays of 0, 310, 710, 1090, 1730 and 2510 nanoseconds and relative average powers of 0, −1, −9, −10, −15 and −20 decibels (dB). Case 2 is a 3 tap model, all with the same average power and with relative delays of 0, 976 and 1200 nanoseconds.

FIGS. 6 and 7 compare the bit error rate (BER) vs. the chip-level signal to noise ratio (SNR) performance of the SIC-LSE receiver with the full JD and RAKE-like receivers under two multi-path fading channel conditions. The group size is forced to be 1, to form K groups, both, at the transmitter and receiver. The theoretical binary phase shift keying (BPSK) BER in an additive white gaussian noise (AWGN) channel that provides a lower bound to the BER is also shown. The BER is averaged over all bursts. FIG. 6 represents the distinct channel case wherein each burst is assumed to pass through an independently fading channel but all channels have the same average power leading to the same average SNR. Thus, in this case, $$\tilde{\underline{h}}^{(i)}, i = 1 \cdots K$$

are distinct while $\gamma^{(i)}$,i=1 . . . K are all equal. Such a situation exists in the uplink where the power control compensates for long-term fading and/or path-loss but not for short-term fading. At each time-slot, the bursts were arranged in power based upon the associated $$\tilde{\underline{h}}^{(i)}, i = 1 \cdots K.$$

FIG. 7 shows similar plots for the common channel case. All bursts are assumed to pass through the same multi-path channel, i.e., $$\tilde{\underline{h}}^{(i)}, i = 1 \cdots K$$

and are all equal, but with different $\gamma^{(i)}$,i=1 . . . K. The $\delta^{(i)}$ are chosen such that neighboring bursts have a power separation of 2 dB when arranged by power level. Such difference in power can exist, for instance, in the downlink where the base station $12_1$ applies different transmit gains to bursts targeted for different UEs $14_1$ to $14_3$. FIGS. 6 and 7 show that in the range of 1% to 10% bit error rate (BER), the SIC-LSE suffers a degradation of less than 1 dB as compared to the JD. This is often the range of interest for the uncoded BER (raw BER). The RAKE receiver exhibits significant degradation, since it does not optimally handle the ISI. As the power differential between bursts increases, the performance of SIC-LSE improves. Depending upon the channel, a power separation of 1 to 2 dB is sufficient to achieve a performance comparable to that of the full JD.

FIGS. 8, 9, 10 and 11 compare the BER vs. SNR performance of the SIC-JD receiver with the full JD and RAKE-like receivers under two multi-path fading channels. The 8 codes are divided into 4 groups of 2 codes each at the transmitter and receiver. The BER is averaged over all bursts. FIGS. 8 and 9 represent the distinct channel case wherein different groups are assumed to pass through independently fading channels. However, all channels have the same average power leading to the same average SNR. All bursts within the same group are subjected to an identical channel response. In this case, $$\underline{\tilde{h}}_g^{(g)},\ g = 1 \cdots G$$

are all distinct, but the channel responses, $$h_g^{(i)},\ i = 1, \cdots n_g,$$

for each burst in the group are equal. $n_g$ is the number of bursts in the $g^{th}$ group. This potentially represents a multi-code scenario on the uplink, where each UE $14_1$ transmits two codes. The SIC-JD receiver 28 groups the multi-codes associated with a single UE $14_1$ into the same group, thus forming 4 groups. FIGS. 10 and 11 represent the common channel case. All groups are assumed to pass through the same multi-path channel, i.e., $$\underline{\tilde{h}}_g^{(i)},\ g = 1 \cdots n_g$$

are all equal, but with different $\gamma_g$,g=1 . . . G. The $\gamma_g$ are chosen such that, when arranged according to power, neighboring groups have a power separation of 2 dB. This potentially represents a multi-code scenario on the downlink where the base station $12_1$ transmits 2 codes per UE $14_1$. FIGS. 10 and 11 show a trend similar to that observed for the SIC-LSE shown in FIGS. 8 and 9. SIC-JD has a performance comparable (within a dB) to the JD in the region of 1% to 10% BER, which is the operating region of interest for the uncoded BER. Depending upon the channel, a power separation of 1 to 2 dB is sufficient to achieve a performance of SIC-LSE comparable to that of the full JD. As shown, performance improves as the power separation between bursts increases.

FIG. 12 is similar to FIG. 10, except that there are only two groups with 4 bursts each. As shown in FIG. 12, SIC-JD has a performance comparable (within a dB) to JD in the region of 1% to 10% BER.

The complexity of SIC-JD is less than full JD. The reduced complexity stems from the replacement of a single-step JD which is a dimension $N_c \times K \cdot N_s$ with G JD stages of dimension $N_c \times n_i \cdot N_s$, i=1 . . . G. Since, typically, JD involves a matrix inversion, whose complexity varies as the cube of the number of bursts, the overall complexity of the multi-stage JD can be significantly lower than that of the single-stage full JD. Furthermore, the complexity of the SIC part varies only linearly with the number of bursts, hence it does not offset this complexity advantage significantly. For instance, the complexity of the G−1 stages of interference cancellation can be derived as follows. Since successive column blocks of $A_g^{(i)}$ are shifted versions of the first block and assuming that elements of $$\hat{\underline{d}}_{g,hard}^{(i)}$$

belong to 1 of 4 QPSK constellation points, the $4 \cdot n_i$ possible vectors can be computed that are needed in computing the product $$A_g^{(i)} \hat{\underline{d}}_{g,hard}^{(i)}.$$

This step requires $$4\alpha \cdot (SF + W - 1) \cdot \frac{\text{Rate}}{10^6} \sum_{i=1}^{G-1} n_i$$

million real operations per sec (MROPS). α=4 is the number of real operations per complex multiplication or multiply and accumulate (MAC). Rate is the number of times the SIC-JD is performed per second. With these $4 \cdot n_i$ vectors already computed, the computation of $$\underline{x}_g^{(i+1)}$$

requires $$\frac{\alpha}{2} \cdot N_s \cdot (SF + W - 1) \cdot \frac{\text{Rate}}{10^6} \sum_{i=1}^{G-1} n_i$$

MROPS. The factor of $$\frac{\alpha}{2}$$

comes from the fact that only complex additions are involved.

Hence, only 2 real operations are required for each complex operation. It then follows that the complexity of G−1 stages of interference cancellation can be expressed by Equation 11.

$$Z = \alpha(SF + W - 1) \cdot \left(4 + \frac{N_s}{2}\right) \cdot \frac{\text{Rate}}{10^6} \cdot \sum_{i=1}^{G-1} n_i \qquad \text{Equation 11}$$

The complexity of converting soft to hard decisions is negligible.

There are several well-known techniques to solve the matrix inversion of JD. To illustrate the complexity, an approach using a very efficient approximate Cholesky factor algorithm with negligible loss in performance as compared to the exact Cholesky factor algorithm was used. The same algorithm can be employed to solve group-wise JD. The complexity of the full JD and the SIC-JD for the 3GPP UTRA TDD system is shown in Table 1. Table 1 compares their complexity for various group sizes. It can be seen that as K increases or as the group size decreases the complexity advantage of the SIC-JD over the full JD increases. The complexity for group size 1, of the SIC-LSE, varies linearly with K and is 33% that of the full JD for K=16. Note that maximum number of bursts in the UTRA TDD system is 16. The complexity advantage of the SIC-JD over full JD will be even more pronounced when the exact Cholesky decomposition is employed. Exact Cholesky decomposition's complexity exhibits a stronger dependence on K, leading to more savings as the dimension of the JD is reduced via SIC-JD.

TABLE 1

| | Complexity of the SIC-JD expressed as a percentage of the complexity of the single-step JD of all K bursts | | | |
|---|---|---|---|---|
| Total number of bursts | K groups of size 1 each (SIC-LSE) | K/2 groups of size 2 each | K/4 groups of size 4 each | K/8 groups of size 8 each |
| 8 | 63% | 67% | 76% | 100% |
| 16 | 33% | 36% | 41% | 57% |

As shown in Table 1, when the number and size of codes is made completely adaptive on an observation interval-by-observation interval basis, the SIC-JD provides savings, on average, over full JD. Since, on average, all bursts do not arrive at the receiver with equal power, depending upon the grouping threshold, the size of the groups will be less then the total number of arriving bursts. In addition, a reduction in peak complexity is also possible if the maximum allowed group size is hard-limited to be less than the maximum possible number of bursts. Such a scheme leads to some degradation in performance when the number of bursts arriving at the receiver with the roughly the same power exceeds the maximum allowed group size. Accordingly, SIC-JD provides a mechanism to trade-off performance with peak complexity or required peak processing power.

What is claimed is:

1. A receiver for use in a time division duplex communication system using code division multiple access, the system communicating using multiple communication bursts in a time slot, the receiver comprising:

an antenna for receiving radio frequency signals including the multiple communication bursts;

a demodulator for demodulating radio frequency signals to produce a baseband signal;

a channel estimation device for estimating a channel response for the bursts;

a successive interference cancellation joint detection (SIC-JD) device comprising:

a first joint detection block for detecting data within the baseband signal for a first group of bursts of the multiple bursts;

a first interference construction block for constructing an estimate of interference of the first group bursts;

a subtractor for subtracting the first group interference from the baseband signal;

a second joint detection block for detecting data within the subtracted signal for a second group of bursts of the multiple bursts;

a first matched filter for processing the baseband signal to match symbol responses of the data signals in the first group; and a second matched filter for processing the subtracted signal to match symbol responses of the data signals in the second group; and wherein an output of the first and second joint detection blocks are soft symbols, the SIC-JD device further comprising a first and second soft to hard decision block for converting the first and second joint detection block outputs into hard symbols.

2. The receiver of claim 1, wherein the SIC-JD device further comprises:

a plurality of additional joint detection blocks for detecting data for additional groups of bursts of the multiple bursts.

3. A device for use in a receiver of a time division duplex communication system using code division multiple access, the system communicating using multiple communication bursts in a time slot, the device comprising:

an input configured to receive a baseband signal associated with received bursts within a time slot;

a first joint detection block for detecting data within the baseband signal for a first group of bursts of the received bursts;

a first interference construction block for constructing an estimate of interference of the first group bursts;

a subtractor for subtracting the first group interference from the baseband signal;

a second joint detection block for detecting data within the subtracted signal for a second group of bursts of the received bursts;

a first matched filter for processing the baseband signal to match symbol responses of the received bursts of the first group; and a second matched filter for processing the subtracted signal to match symbol responses of the received bursts of the second group; and wherein an output of the first and second joint detection blocks are soft symbols, the device further comprising a first and second soft to hard decision block converting the first and second joint detection block outputs into hard symbols.

4. The device of claim 3 further comprising additional joint detection blocks for detecting data for additional groups of bursts of the multiple bursts.

* * * * *

UNITED STATES PATENT AND TRADEMARK OFFICE
CERTIFICATE OF CORRECTION

PATENT NO. : 6,963,546 B2
APPLICATION NO. : 09/783792
DATED : November 8, 2005
INVENTOR(S) : Misra et al.

It is certified that error appears in the above-identified patent and that said Letters Patent is hereby corrected as shown below:

Title Page, Item (56), OTHER PUBLICATIONS, page 1, right column, line 4, after "pp. 1058-1065.", add a new Publication paragraph as follows:

--Tsatsanis M. K. et al., "Adaptive Blind Interference Cancellation in CDMA Systems," Seamless Interconnection for Universal Services, Global Telecommunications Conference, Globecom, 1999, Rio DeJaneiro, Brazil, Vol. 1a, pp.487-491.--

At column 2, line 41, after the words "on the", delete "communications" and insert therefor --communication's--.

At column 4, line 16, after the words "experiencing a", delete "similarly" and insert therefor --similar--.

At column 5, lines 59-61, delete " $\underline{y}_g^{(1)}$
52." and insert therefor --$\underline{y}_g^{(1)}$, 52.--.

At column 7, lines 24-26, delete "$\underline{x}_g^{(2)} - \underline{\hat{r}}^{(2)} = \underline{x}_g^{(3)}$,
62." and insert therefor
--$\underline{x}_g^{(2)} - \underline{\hat{r}}^{(2)} = \underline{x}_g^{(3)}$, 62.--.

At column 7, line 31, after, "to", delete "recovery" and insert therefor --recover--.

At column 8, line 57, delete " $\underline{\tilde{h}}^{(i)}$,i=1 ... K" and insert therefor-- $\underline{h}^{(i)}$,i=1 ... K --.

At column 11, line 29, after the word "less", delete "then" and insert therefor --than--.

Signed and Sealed this

Sixteenth Day of October, 2007

JON W. DUDAS
*Director of the United States Patent and Trademark Office*